(12) United States Patent
Dahlberg et al.

(10) Patent No.: US 12,079,347 B2
(45) Date of Patent: Sep. 3, 2024

(54) SYSTEMS AND METHODS FOR ASSESSING CYBERSECURITY RISK IN A WORK FROM HOME ENVIRONMENT

(71) Applicant: BitSight Technologies, Inc., Boston, MA (US)

(72) Inventors: Daniel Dahlberg, Somerville, MA (US); Stephen Boyer, Waltham, MA (US); Philip John Steuart Gladstone, Carlisle, MA (US)

(73) Assignee: BitSight Technologies, Inc., Boston, MA (US)

( * ) Notice: Subject to any disclaimer, the term of this patent is extended or adjusted under 35 U.S.C. 154(b) by 226 days.

(21) Appl. No.: 17/710,168

(22) Filed: Mar. 31, 2022

(65) Prior Publication Data

US 2022/0318400 A1    Oct. 6, 2022

Related U.S. Application Data

(60) Provisional application No. 63/169,006, filed on Mar. 31, 2021.

(51) Int. Cl.
*G06F 21/57*        (2013.01)

(52) U.S. Cl.
CPC ...... *G06F 21/577* (2013.01); *G06F 2221/034* (2013.01)

(58) Field of Classification Search
CPC .. G06F 21/577; G06F 2221/034; G06F 21/50; G06F 21/604; G06F 21/606; G06F 21/57
See application file for complete search history.

(56) References Cited

U.S. PATENT DOCUMENTS

| 5,867,799 A | 2/1999 | Lang et al. |
| 6,016,475 A | 1/2000 | Miller et al. |

(Continued)

FOREIGN PATENT DOCUMENTS

| WO | WO-2017/142694 A1 | 1/2019 |
| WO | WO-2019/023045 A1 | 1/2019 |

OTHER PUBLICATIONS

U.S. Appl. No. 15/377,574 U.S. Pat. No. 9,705,932, Methods and Systems for Creating, De-Duplicating, and Accessing Data Using an Object Storage System, filed Dec. 13, 2016.

(Continued)

*Primary Examiner* — Quazi Farooqui
(74) *Attorney, Agent, or Firm* — Goodwin Procter LLP

(57) ABSTRACT

Methods and systems are provide for assessing the cybersecurity state of entities based on extended-computer network characteristics. A method can include obtaining, for a plurality of computer networks associated with an entity and not associated with the entity, a first and second network dataset. The first and second network datasets can be combined. A plurality of Internet Protocol (IP) addresses associated with the entity and associated with a plurality of entities can be obtained, where the entity and the plurality of entities each associated with a unique identifier (UID). The method can include determining whether each of the plurality of computer networks not associated with the entity comprises a remote office network. A cybersecurity state of the entity can be determined based on an evaluation of security characteristics of the IP addresses associated with the entity and of one or more IP addresses attributed to the remote office networks.

20 Claims, 6 Drawing Sheets

(56) References Cited

U.S. PATENT DOCUMENTS

| | | |
|---|---|---|
| 6,745,150 B1 | 6/2004 | Breiman |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| D652,048 S | 1/2012 | Joseph |
| D667,022 S | 9/2012 | LoBosco et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| D691,164 S | 10/2013 | Lim et al. |
| D694,252 S | 11/2013 | Helm |
| D694,253 S | 11/2013 | Helm |
| 8,584,233 B1 | 11/2013 | Yang et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,752,183 B1 | 6/2014 | Heiderich et al. |
| 8,775,402 B2 | 7/2014 | Baskerville et al. |
| 8,825,662 B1 | 9/2014 | Kingman et al. |
| 8,949,988 B2 | 2/2015 | Adams et al. |
| 8,966,639 B1 | 2/2015 | Roytman et al. |
| D730,918 S | 6/2015 | Park et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,420,049 B1 | 8/2016 | Talmor et al. |
| 9,424,333 B1 | 8/2016 | Bisignani et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| 9,736,019 B2 | 8/2017 | Hardison et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D809,989 S | 2/2018 | Lee et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |
| D863,335 S | 10/2019 | Hardy et al. |
| D863,345 S | 10/2019 | Hardy et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| D880,512 S | 4/2020 | Greenwald et al. |
| D894,939 S | 9/2020 | Braica |
| 10,764,298 B1 | 9/2020 | Light et al. |
| 10,776,483 B2 | 9/2020 | Bagulho Monteiro Pereira |
| 10,796,260 B2 | 10/2020 | Brannon et al. |
| D903,693 S | 12/2020 | Li et al. |
| D905,712 S | 12/2020 | Li et al. |
| D908,139 S | 1/2021 | Hardy et al. |
| 10,896,394 B2 | 1/2021 | Brannon et al. |
| 10,909,488 B2 | 2/2021 | Hecht et al. |
| D918,955 S | 5/2021 | Madden, Jr. et al. |
| D920,343 S | 5/2021 | Bowland |

(56) References Cited

U.S. PATENT DOCUMENTS

| | | | |
|---|---|---|---|
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| D924,909 S | 7/2021 | Nasu et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0228899 A1* | 10/2005 | Wendkos ............ H04L 67/306 709/219 |
| 2005/0234767 A1 | 10/2005 | Bolzman et al. |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2008/0270458 A1 | 10/2008 | Gvelesiani |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin et al. |
| 2010/0114634 A1 | 5/2010 | Christiansen et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239300 A1 | 9/2011 | Klein et al. |
| 2011/0249002 A1 | 10/2011 | Duplessis et al. |
| 2011/0282997 A1 | 11/2011 | Prince et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0059823 A1 | 3/2012 | Barber et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0055386 A1 | 2/2013 | Kim et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0263270 A1 | 10/2013 | Cote et al. |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137257 A1 | 5/2014 | Martinez et al. |
| 2014/0146370 A1 | 5/2014 | Banner et al. |

(56) References Cited

U.S. PATENT DOCUMENTS

| | | |
|---|---|---|
| 2014/0173066 A1 | 6/2014 | Newton et al. |
| 2014/0189098 A1 | 7/2014 | MaGill et al. |
| 2014/0204803 A1 | 7/2014 | Nguyen et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0023639 A1 | 1/2016 | Cajiga et al. |
| 2016/0036849 A1 | 2/2016 | Zakian |
| 2016/0065613 A1 | 3/2016 | Cho et al. |
| 2016/0088015 A1 | 3/2016 | Sivan et al. |
| 2016/0119373 A1 | 4/2016 | Fausto et al. |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0241560 A1 | 8/2016 | Reshadi et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0364496 A1 | 12/2016 | Li |
| 2016/0373485 A1 | 12/2016 | Kamble |
| 2017/0048267 A1 | 2/2017 | Yampolskiy et al. |
| 2017/0063901 A1 | 3/2017 | Muddu et al. |
| 2017/0104783 A1 | 4/2017 | Vanunu et al. |
| 2017/0142148 A1 | 5/2017 | Busser et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0279843 A1 | 9/2017 | Schultz et al. |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0285414 A1 | 10/2018 | Kondiles et al. |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2018/0375953 A1* | 12/2018 | Casassa Mont .... H04L 61/5014 |
| 2019/0034845 A1 | 1/2019 | Mo et al. |
| 2019/0065545 A1 | 2/2019 | Hazel et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1 | 5/2019 | Steele et al. |
| 2019/0179490 A1 | 6/2019 | Barday et al. |
| 2019/0215331 A1 | 7/2019 | Anakata et al. |
| 2019/0297106 A1 | 9/2019 | Geil et al. |
| 2019/0303574 A1 | 10/2019 | Lamay et al. |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0053127 A1 | 2/2020 | Brotherton et al. |
| 2020/0065213 A1 | 2/2020 | Poghosyan et al. |
| 2020/0074084 A1 | 3/2020 | Dorrans et al. |
| 2020/0092172 A1 | 3/2020 | Kumaran et al. |
| 2020/0097845 A1 | 3/2020 | Shaikh et al. |
| 2020/0106798 A1 | 4/2020 | Lin |
| 2020/0125734 A1 | 4/2020 | Light et al. |
| 2020/0183655 A1 | 6/2020 | Barday et al. |
| 2020/0272763 A1 | 8/2020 | Brannon et al. |
| 2020/0285737 A1 | 9/2020 | Kraus et al. |
| 2020/0356689 A1 | 11/2020 | McEnroe et al. |
| 2020/0356695 A1 | 11/2020 | Brannon et al. |

OTHER PUBLICATIONS

U.S. Appl. No. 14/021,585 U.S. Pat. No. 9,438,615 Published as: US2015/0074579, Security Risk Management, filed Sep. 9, 2013.

U.S. Appl. No. 15/216,955 Published as: US2016/0330231, Methods for Using Organizational Behavior for Risk Ratings, filed Jul. 22, 2016.

U.S. Appl. No. 15/239,063 Published as: US2017/0093901, Security Risk Management, filed Aug. 17, 2016.

U.S. Appl. No. 16/405,121 Published as US2019/0260791, Methods for Using Organizational Behavior for Risk Ratings, filed May 7, 2019.

U.S. Appl. No. 17/025,930, Methods for Using Organizational Behavior for Risk Ratings, filed Sep. 18, 2020.

U.S. Appl. No. 13/240,572 Published as: US2016/0205126, Information Technology Security Assessment System, filed Sep. 22, 2011.

U.S. Appl. No. 14/944,484 U.S. Pat. No. 9,973,524 Published as: US2016/0323308, Information Technology Security Assessment System, filed Nov. 18, 2015.

U.S. Appl. No. 15/142,677 U.S. Pat. No. 9,830,569 Published as: US/2016/0239772, Security Assessment Using Service Provider Digital Asset Information, filed Apr. 29, 2016.

U.S. Appl. No. 17/069,151 Published as: US/2021/0211454, Information Technology Security Assessment System, filed Oct. 13, 2020.

(56) References Cited

OTHER PUBLICATIONS

U.S. Appl. No. 15/134,845 U.S. Pat. No. 9,680,858, Annotation Platform for a Security Risk System, filed Apr. 21, 2016.
U.S. Appl. No. 15/044,952 Published as: US2017/0236077, Relationships Among Technology Assets and Services and the Entittes Responsible for Them, filed Feb. 16, 2016.
U.S. Appl. No. 15/089,375 U.S. Pat. No. 10,176,445 Published as: US2017/0236079, Relationships Among Technology Assets and Services and the Entittes Responsible for Them, filed Apr. 1, 2016.
U.S. Appl. No. 29/598,298 D. 835,631, Computer Display Screen With Graphical User Interface, filed Mar. 24, 2017.
U.S. Appl. No. 29/598,299 D. 818,475, Computer Display Screen With Graphical User Interface, filed Mar. 24, 2017.
U.S. Appl. No. 29/599,622, Computer Display Screen With Graphical User Interface, filed Apr. 5, 2017.
U.S. Appl. No. 29/599,620, Computer Display Screen With Graphical User Interface, filed Apr. 5, 2017.
U.S. Appl. No. 16/015,686, Methods for Mapping IP Addresses and Domains to Organizations Using User Activity Data, filed Jun. 22, 2018.
U.S. Appl. No. 16/543,075, Methods for Mapping IP Addresses and Domains to Organizations Using User Activity Data, filed Aug. 16, 2019.
U.S. Appl. No. 16/738,825, Methods for Mapping IP Addresses and Domains to Organizations Using User Activity Data, filed Jan. 9, 2020.
U.S. Appl. No. 17/146,064, Methods for Mapping IP Addresses and Domains to Organizations Using User Activity Data, filed Jan. 11, 2021.
U.S. Appl. No. 15/918,286, Correlated Risk in Cybersecurity, filed Mar. 12, 2018.
U.S. Appl. No. 16/292,956, Correlated Risk in Cybersecurity, filed May 5, 2019.
U.S. Appl. No. 16/795,056, Correlated Risk in Cybersecurity, filed Feb. 19, 2020.
U.S. Appl. No. 17/179,630 Published as: US2021/0176269, Correlated Risk in Cybersecurity, filed Feb. 19, 2021.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 17/000,135, Systems and Methods for Remote Detection of Software Through Browser Webinjects, filed Aug. 21, 2020.
U.S. Appl. No. 17/401,683, Systems and Methods for Remote Detection of Software Through Browser Webinjects, filed Aug. 13, 2021.
U.S. Appl. No. 15/954,921, Systems and Methods for External Detection of Misconfigured Systems, filed Apr. 17, 2018.
U.S. Appl. No. 17/014,495 Published as: US2020/0404017, Systems and Methods for External Detection of Misconfigured Systems, filed Sep. 8, 2020.
U.S. Appl. No. 16/549,764 Published as: US2021/0058421, Systems and Methods for Inferring Entity Relationships via Network Communications of Users or User Devices, filed Aug. 23, 2019.
U.S. Appl. No. 16/787,650, Systems and Methods for Inferring Entity Relationships via Network Communications of Users or User Devices, filed Feb. 11, 2020.
U.S. Appl. No. 16/583,991, Systems and Methods for Network Asset Discovery and Association Thereof With Entities, filed Sep. 26, 2019.
U.S. Appl. No. 17/085,550 Published as: US2021/0099347, Systems and Methods for Network Asset Discovery and Association Thereof With Entities, filed Oct. 30, 2020.
U.S. Appl. No. 29/666,942, Computer Display With Graphical User Interface, filed Oct. 17, 2018.
U.S. Appl. No. 16/360,641 U.S. Pat. No. 11,200,323, Systems and Methods for Forecasting Cybersecurity Ratings Based on Event-Rate Scenarios, filed Mar. 21, 2019.
U.S. Appl. No. 17/523,166, Systems and Methods for Forecasting Cybersecurity Ratings Based on Event-Rate Scenarios, filed Nov. 10, 2021.
U.S. Appl. No. 16/514,771, Systems and Methods for Generating Security Intprovement Plans for Entities, filed Jul. 17, 2019.
U.S. Appl. No. 16/922,672, Systems and Methods for Generating Security Improvement Plans for Entities, filed Jul. 7, 2020.
U.S. Appl. No. 17/307,577 Published as: US2021/0326449, Systems and Methods for Generating Security Improvement Plans for Entities, filed May 4, 2021.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 17/018,587, Systems and Methods for Assessing Cybersecurity State of Entities Based on Computer Network Characterization, filed Sep. 11, 2020.
U.S. Appl. No. 16/779,437 Published as: US2021/0243221, Systems and Methods for Rapidly Generating Security Ratings, filed Jan. 31, 2020.
U.S. Appl. No. 17/132,512, Systems and Methods for Rapidly Generating Security Ratings, filed Dec. 23, 2020.
U.S. Appl. No. 17/119,822, Systems and Methods for Cybersecurity Risk Mitigation and Management, filed Dec. 11, 2020.
U.S. Appl. No. 29/815,855, Computer Display With a Graphical User Interface for Cybersecurity Risk Management, filed Nov. 17, 2021.
U.S. Appl. No. 17/392,521, Systems and Methods for Cybersecurity Risk Mitigation and Management, filed Aug. 3, 2021.
U.S. Appl. No. 16/802,232, Systems and Methods for Improving a Security Profile of an Entity Based on Peer Security Profiles, filed Feb. 26, 2020.
U.S. Appl. No. 16/942,452, Systems and Methods for Improving a Security Profile of an Entity Based on Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641, Computer Display With Peer Analytics Graphical User Interface, filed Jun. 2, 2020.
U.S. Appl. No. 17/039,675, Systems and Methods for Determining Asset Importance in Security Risk Management, filed Sep. 30, 2020.
U.S. Appl. No. 17/320,997, Systems and Methods for Determining Asset Importance in Security Risk Management, filed May 14, 2021.
U.S. Appl. No. 16/884,607, Systems and Methods for Managing Cybersecurity Alerts, filed May 27, 2020.
U.S. Appl. No. 17/236,594, Systems and Methods for Managing Cybersecurity Alerts, filed Apr. 21, 2021.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Master Security Criteria," Version 3.0, BITS Financial Services Security Laboratory, Oct. 2001, 47 pages.

(56) References Cited

OTHER PUBLICATIONS

"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV06EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.II.miLedufpublicationsflabnotesfpluggingtherightho! . . . , 2 pages.
"Rapid7 Nexpose Vulnerability Scanner," accessed on the internet at https://www.rapid7.com/products/nexpose/download/, 3 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
U.S. Appl. No. 13/240,572.
Artz, Michael Lyle, "NetSPA: A Network Security Planning Architecture," Massachusetts Institute of Technology, May 24, 2002, 97 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The Mckinsey Quarterly, No. 4, 2003, pp. 40-49.
Camelo, "Botnet Cluster Identification," Sep. 2014, 90 pages.
Camelo, "Condenser: A Graph-based Approach for Detecting Botnets," AnubisNetworks R&D, Amadora, Portugal and CENTRIA, Universidade NOVA de Lisboa, Portugal (pp. 8) Oct. 31, 2014.
Carstens, et al., "Modeling Company Risk and Importance in Supply Graphs," European Semantic Web Conference 2017: The Semantic Web pp. 18-31.
Chernyshev, M. et al., "On 802.11 Access Point Locatability and Named Entity Recognition in Service Set Identifiers", IEEE Trans. on Info. and Sec., vol. 11 No. 3 (Mar. 2016).
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gephi (gephi.org), accessed on the internet at https://web.archive.org/web/20151216223216/https://gephi.org/; Dec. 16, 2015; 1 page.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (Policy). Http://ieeexplore.ieee.org/stamp/stamp.jsp?arnumber=5976796. 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al, "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).

(56) References Cited

OTHER PUBLICATIONS

Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, Mit Lincoln Laboratory, Oct. 5, 2005, 96 pages.
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber= 1258471 (Year: 2003).
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
Maxmind, https://www.maxmind.com/en/about-maxmind, https://www.maxmind.com/en/geoip2-isp-database, date accessed Sep. 28, 20116, 3 pages.
McNab, "Network Security Assessment," copyright 2004, 13 pages.
McNab, "Network Security Assessment," copyright 2004, 56 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Morningstar Direct, dated to Nov. 12, 202, morningstardirect.com [online]. Retrieved Feb. 26, 2021 from internet <URL:https://web.archive.org/web/20201112021943/https://www.morningstar.com/products/direct> (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
U.S. Appl. No. 14/021,585.
U.S. Appl. No. 13/240,572 and pending claims.
U.S. Appl. No. 13/240,572, application as filed and pending claims.
U.S. Appl. No. 14/021,585 and pending claims.
U.S. Appl. No. 14/021,585 and application as filed.
U.S. Appl. No. 14/944,484 and pending claims.
U.S. Appl. No. 61/386,156.
U.S. Appl. No. 14/944,484.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost In the Browser Analysis of Web-based Malware", 2007 (9 pages).
Rare Events, Oct. 2009, JASON, The MITRE Corporation, Oct. 2009, 104 pages.
Rees, L. P. et al., "Decision support for cybersecurity risk planning." Decision Support Systems 51.3 (2011): pp. 493-505.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
Santos, J. R. et al., "A framework for linking cybersecurity metrics to the modeling of macroeconomic interdependencies." Risk Analysis: An International Journal (2007) 27.5, pp. 1283-1297.
SBIR Phase I: Enterprise Cyber Security Scoring, CyberAnalytix, LLC, http://www.nsf.gov/awardsearch/showAward.do?AwardNumber=1013603, Apr. 28, 2010, 2 pages.
Search Query Report form IP.com (performed Apr. 27, 2020).
Security Warrior, Cyrus Peikari, Anton, Chapter 8: Reconnaissance, 6 pages.
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Dun & Bradstreet Corp. Stock Report, Standard & Poor's, Jun. 6, 2009, 8 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
Winship, C., "Models for sample selection bias", Annual review of sociology, 18(1) (Aug. 1992), pp. 327-350.

* cited by examiner

SYSTEMS AND METHODS FOR ASSESSING CYBERSECURITY RISK IN A WORK FROM HOME ENVIRONMENT

CROSS-REFERENCE TO RELATED APPLICATIONS

This application claims priority to and benefit of U.S. Provisional Patent Application No. 63/169,006, entitled "SYSTEMS AND METHODS FOR ASSESSING CYBERSECURITY RISK IN A WORK FROM HOME ENVIRONMENT," filed on Mar. 31, 2021, the entirety of which is incorporated herein by reference.

TECHNICAL FIELD

The following disclosure is directed to methods and systems for assessing the cybersecurity state of entities based on computer network characterization and, more specifically, methods and systems for assessing the cybersecurity state of entities based on characterization of networks associated with devices observed on entity networks.

BACKGROUND

As employees have transitioned to non-standard (e.g., work from home) working arrangements, employees have begun using employee devices on remote networks that exist outside of network(s) directly associated with an entity (e.g., business owner, service provider, organization, etc.). However, while the use of the remote networks has added flexibility and convenience to employee working arrangements, the use of employee devices on remote networks has the capacity to introduce security risks to an entity and their associated network(s). Thus, an entity may wish to identify the remote networks accessed by employee devices to better understand the extended cybersecurity risks introduced by the remote networks commonly accessed by employees.

SUMMARY

Disclosed herein are methods and systems for assessing the cybersecurity state of entities based on extended-computer network characteristics for Work From Home Remote Office (WFH-RO) networks. For example, extended network characteristics may include: the type of network, the use of the network, the identity of the network, the entity or entities associated with the network, the devices that access the network, etc. The exemplary methods and systems described herein can determine the computing devices that access an entity's computer networks (e.g., wired and/or wireless networks), determine WFH-RO networks (e.g., wired and/or wireless networks) accessed by the computing devices, and determine and adjust the cybersecurity state (e.g., security rating) of the entity by including (or selectively including) security characteristics related to the WFH-RO networks accessed by the computing devices. WFH-RO networks can include the network(s) accessed by individuals associated with an entity (e.g., employees, contractors, etc.), where the network(s) are external to the networks managed or owned by the entity, such that the entity may not have visibility and/or control of these networks. In some examples, the cybersecurity state of the entity may be more accurately determined by excluding security characteristics for WFH-RO networks that are determined to be shared (e.g., public, common-access, etc.) networks or service provider (e.g., cellular, internet-provider, etc.) networks, as these networks may skew the findings of WFH-RO networks from the private (e.g., home, residential, etc.) networks typically accessed by employee devices for work purposes.

Exemplary systems may characterize computer networks associated with an entity based on Internet Protocol (IP) addresses (e.g., IPv4 or IPv6), identifiers (e.g., device identifiers, user identifiers, application identifiers, etc.) associated with computing devices that connect to the network(s) (e.g., wired or wireless network), and/or timestamp information indicating the time/duration of a connection to the network(s). In some embodiments, the systems may determine the security characteristic(s) of the computer networks associated with an entity based on the WFH-RO network(s) accessed by users of the computer networks associated with an entity. In some embodiments, assessing the cybersecurity state of entities can include determining the security ratings for entities based on an evaluation of the security characteristics associated with the WFH-RO network(s) that are frequently accessed by user devices and by excluding security characteristics associated with the WFH-RO network(s) that are infrequently accessed by user devices or frequently accessed by non-user devices.

In one aspect, the disclosure features a computer-implemented method including obtaining, for at least one computer network of a plurality of computer networks associated with an entity, a first network dataset and obtaining, for at least one computer network of a plurality of computer networks not associated with the entity and providing access to the at least one computer network of the plurality of computer networks associated with the entity, a second network dataset and combining the first and second network datasets to form a combined dataset comprising a plurality of entries, wherein each entry comprises a device identifier, a network identifier, and a timestamp identifier. The method can also include obtaining a plurality of Internet Protocol (IP) addresses associated with the entity and obtaining a plurality of IP addresses associated with a plurality of entities unrelated to the entity, wherein the entity and the plurality of entities unrelated to the entity are each associated with a unique identifier (UID). For each of the plurality of entries, if the respective network identifier of the entry corresponds to a threshold number of associated UIDs, the method can also include removing the entry from the combined network dataset to form a filtered dataset. The method can also include determining, based in part on the IP addresses associated with the entity, whether each of the plurality of computer networks not associated with the entity comprises a remote office network of one or more remote office networks associated with the entity based on the filtered network dataset. A cybersecurity state of the entity is then determined based on an evaluation of security characteristics of the IP addresses associated with the entity and security characteristics of one or more IP addresses attributed to the one or more remote office networks.

In certain examples, each device identifier can correspond to a computing device. Each network identifier can correspond to a computer network of the plurality of computer networks associated with the entity or to a computer network of the plurality of computer networks not associated with the entity and providing access to the at least one computer network of the plurality of computer networks associated with the entity. Each timestamp identifier can correspond to a timestamp at which the computing device accessed the computer network. The plurality of entities unrelated to the entity can include a plurality of proxy provider entities. For each of the plurality of entries, if the respective network identifier of the entry corresponds to one of the plurality of proxy provider entities, the network identifier can be replaced with an origin network identifier. For each of the plurality of entries, if the respective device identifier of the entry is associated with less than a threshold number of network identifiers from the plurality of entries, the entry can be removed from the plurality of entries of the combined dataset. The plurality of IP addresses associated with the entity and with the plurality of entities unrelated to the entity can be mapped to the combined dataset. Based on the mapping, for each of the plurality of entries comprising a network identifier corresponding to one of the mapped plurality of IP addresses, the respective UID associated with the entity or associated with one of the plurality of entities unrelated to the entity can be assigned to the entry.

In certain examples, the mapping can include for each of the plurality of entries: determining whether one of the plurality of IP addresses associated with the entity and with the plurality of entities unrelated to the entity corresponds to the network identifier of the entry and if one of the plurality of IP addresses associated with the entity or with the plurality of entities unrelated to the entity corresponds to the network identifier of the entry, identifying the respective UID associated with the corresponding entity or the corresponding one of the plurality of entities unrelated to the entity. Based on the plurality of entries, a pair dataset including a plurality of unique pairs can be generated, wherein each unique pair comprises a respective device identifier and a respective UID from one of the plurality of entries. The plurality of entities unrelated to the entity can include a plurality of service provider entities. For each of the plurality of unique pairs, if the unique pair corresponds to one of the plurality of service provider entities, the unique pair can be removed from the pair dataset. Removing the respective unique pair from the pair dataset can include determining one of the respective UIDs associated with the plurality of service provider entities corresponds to the respective UID of the unique pair. Based on respective device identifiers of both the combined dataset and the pair dataset, the method can include identifying each respective UID of the plurality of pairs associated with the respective network identifiers from the plurality of entries. The method can include assigning the respective identified UIDs of the plurality of pairs to the plurality of entries of the combined dataset as the associated UIDs.

In certain examples, assigning the respective UIDs of the plurality of pairs to the plurality of entries as the associated UIDs can include determining, for each of the plurality of pairs, whether the respective UID of the respective pair is associated with one or more of the respective network identifiers of the plurality of entries based on the respective device identifier of the respective pair and the respective device identifiers of the plurality of entries; and if the respective UID of the respective pair is associated with one or more of the respective network identifiers of the plurality of entries, mapping the respective UID of the respective pair to the plurality of entries including the one or more of the respective network identifiers as one of the associated UIDs. For each network identifier of the plurality of entries, the method can include determining, based on the associated UIDs of the combined dataset, a first number of the respective device identifiers from the plurality of pairs that are associated with the respective network identifier. The first number of the respective device identifiers from the plurality of pairs are each associated with a common associated UID. For each network identifier of the plurality of entries, the method can include determining a second number of respective device identifiers from the plurality of entries that are associated with the respective network identifier. The plurality of entities unrelated to the entity can include a plurality of non-service provider entities. For each of the plurality of entries, if the respective UID of the entry corresponds to one of the plurality of non-service provider entities, the entry can be removed from the plurality of entries of the combined dataset. For each network identifier of the plurality of entries, the method can include determining a ratio of the first number to the second number; and if the determined ratio is below a threshold value, removing the respective entry including the respective network identifier from the plurality of entries of the combined dataset.

In certain examples, for each of the plurality of entries, if the respective UID of the entry matches the respective associated UID of the entry, the entry can be removed from the plurality of entries of the combined dataset. For each of the plurality of entries, the method can include determining a number of respective associated UIDs associated with the respective network identifier of the entry. Determining whether each of the plurality of computer networks not associated with the entity comprises a remote office network of the one or more remote office networks associated with the entity based on the filtered network dataset can include: for each of the plurality of entries of the filtered dataset, if the UID associated with the entity corresponds to the respective associated UID of the respective entry, associating an IP address to the entity. The IP address can correspond to the respective network identifier of the entry.

Other embodiments of this aspect include corresponding systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

DETAILED DESCRIPTION

Figure 1:
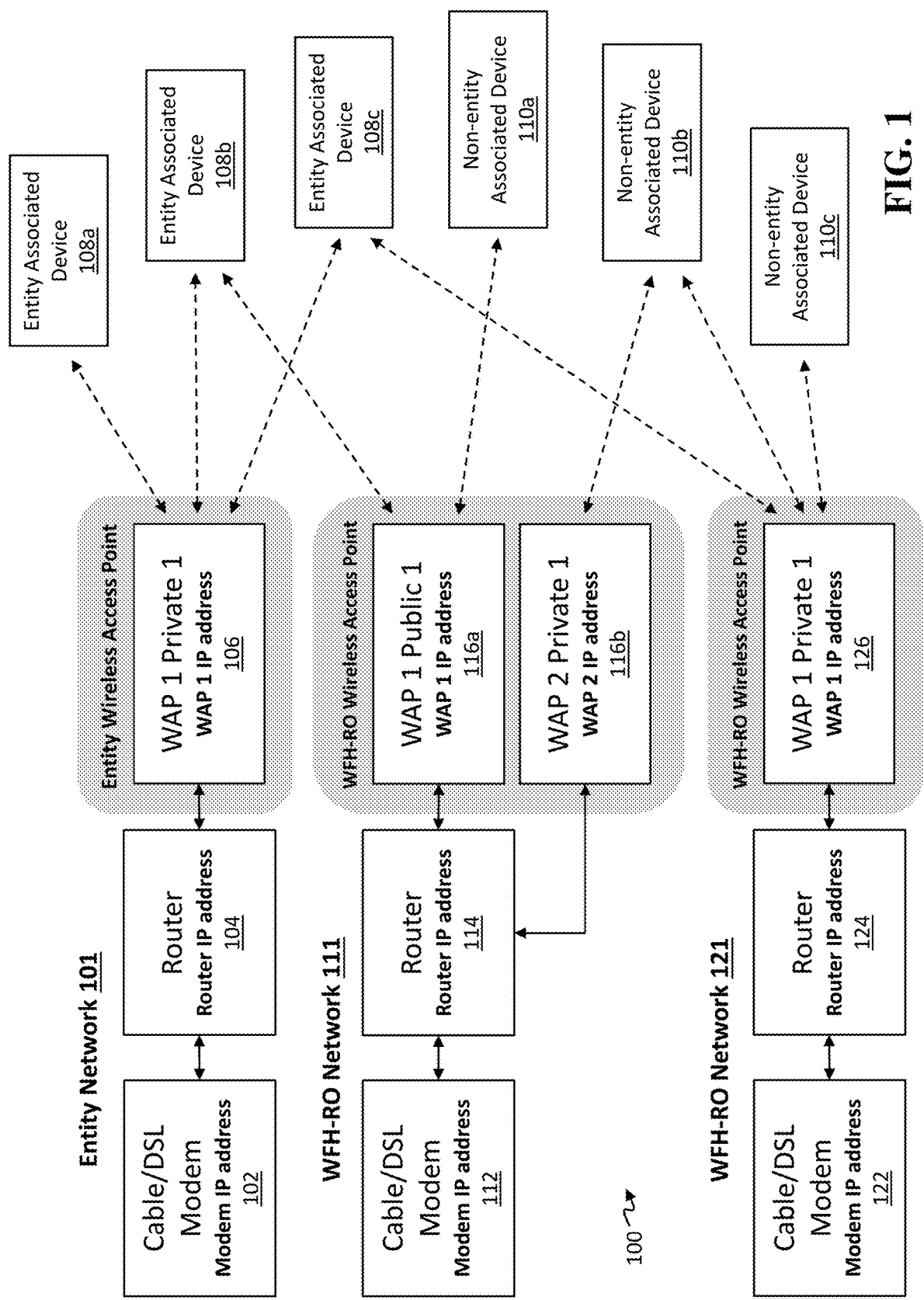
FIG. 1 is a diagram of an exemplary computing environment for an entity.

Disclosed herein are exemplary embodiments of systems and methods for assessing the cybersecurity state of entities based on extended-computer network characteristics for Work From Home Remote Office (WFH-RO) networks. Entities can include corporations, schools, governments, individuals, etc. In some embodiments, by identifying devices that access entities' computer networks, identifying corresponding WFH-RO networks accessed by the devices, and evaluating related security characteristics for the WFH-RO networks, entities can be more accurately rated as to their security risks and/or security record.

Computer networks may be wired or wireless. In some embodiments, a private network can be a host network, a secured network, etc. (e.g., a virtual private network (VPN), an enterprise private network (EPN), a personal area network (PAN), etc.). In some embodiments, a public network can be a guest network, an unsecured network, etc. (e.g., a wide-area network (WAN), a metropolitan area network (MAN), etc.). Some types of networks may have both public or private variants.

Entities may manage (or have managed on their behalf) one or more networks, including: only private network(s), only public network(s), or both private network(s) and public network(s). In some embodiments, if only the network(s) managed by an entity are identified, then the cybersecurity state (e.g., security rating) of the entity can be based solely on the network(s) managed by an entity. For instance, the entity's security rating can be limited to the security characteristics of the identified public network(s) and private network(s). In some scenarios, however, the network(s) managed by an entity and/or may be accessed remotely via devices that are also utilizing one or more WFH-RO networks. In some embodiments, computing devices associated with an entity (e.g., employee computing devices) may access one or more WFH-RO networks as a gateway to the managed networks. For example, a user (e.g., employee) of an entity may perform entity-related (e.g., work-related) activities using a computing device connected to a WFH-RO network wireless or wired network, which may, in some cases, connect to an entity managed network (e.g., via VPN or other secure means). In some embodiments, if both the network(s) managed by the entity and the WFH-RO network(s) are identified as associated with the entity, then the security rating of the entity can be based on the identified network(s) managed by the entity and the WFH-RO network(s). For instance, the cybersecurity state (e.g., security rating) which would normally solely be based on the security characteristics of the identified network(s) managed by the entity can also consider the cybersecurity state of the WFH-RO networks accessed by individuals using computing devices associated with the entity.

Any of the below-described exemplary methods and systems can be used alone or in combination to characterize WFH-RO networks associated with entities and determine how the addition of these networks impacts the overall cybersecurity state of the entities. The methods and systems can include obtaining dataset(s) including network identifier(s) for networks managed by entities and obtaining dataset(s) including network identifiers for network(s) (e.g., WFH-RO network(s)), device identifiers for device(s) that accessed the network(s), and/or timestamp(s) indicative of the time/duration the device(s) accessed the network(s) to characterize entities' computer networks. In some embodiments, one dataset may be used to enrich other datasets. For example, the datasets as described herein may be combined to determine relationships between networks managed by entities and the other networks (e.g., WFH-RO networks) accessed by devices that also access the networks managed by entities. For example, an IP address (associated with an entity-managed network) and an IP address (associated with a WFH-RO network) can be linked by a device that accesses networks associated with both IP addresses.

Identifier Characterization for Networking Datasets

In some embodiments, the system can characterize WFH-RO networks based on associating dataset(s) including network identifiers (for an observed network), device identifiers, and/or timestamp identifiers with dataset(s) including known network identifiers for networks managed by entities. Observing device activity as a computing device accesses the Internet via various computer networks can reveal information about the networks themselves. Traces of device activity can be determined from the device cookies, fingerprints, and/or unique identifier(s) associated with the devices, as well as network identifying information. A network identifier may correspond to a network accessed by and/or otherwise connected to a computing device. The network identifiers may be an IP address, including, for example, an IPv4 address or an IPv6 address. The network identifiers may be abstracted to be more precise or less precise. For example, an IPv6 address may be abstracted to its' corresponding "/64" subnet.

In some embodiments, a device identifier may correspond to a computing device that accessed and/or otherwise connected to a network. A computing device can include any user device that can be connected to a computer network via a wired or wireless connection. For example, user devices can include mobile phones, smart phones, smart watches, laptops, notebook computers, desktop computers, tablets, Internet-of-things (IoT) devices, etc. The device identifier may include an identifier associated with a hardware device, including, for example, an identifier provided by the manufacturer (e.g., a serial number), an identifier associated to a device modem (e.g., an International Mobile Equipment Identity (IMEI) number), an operating system license number, an identifier associated with the SIM card (e.g., the SIM number), an installation identifier (e.g., a Universally Unique Identifier (UUID)), an advertiser identifier (e.g., a Identifier for Advertisers (IDFA)), an identifier associated with the telephony services (e.g., a phone number), an identifier associated to the network interface (e.g., a MAC address), and/or any other artifact uniquely associated with a hardware device. In some cases, the device identifier may correspond to a user identifier for a user of a computing device that accessed and/or otherwise connected to a network. A user identifier may include, for example, an email address, phone number, and/or any other artifact uniquely associated with an individual. In some cases, the device identifier may correspond to an application identifier for an application installed/used at a computing device that accessed and/or otherwise connected to a network. An application identifier, including, for example, an application installation UUID, web-based cookies (e.g., Hypertext Transfer Protocol (HTTP) cookies provided by web servers or application programming interface (API) during use of an application), an account identifier (e.g., a username), and/or any other artifact uniquely associated with an application installed and/or otherwise operating at the hardware device.

In some embodiments, a timestamp identifier may correspond to a time and/or duration at which a computing device (e.g., mobile phone, tablet, laptop computer, desktop computer, etc.) accessed and/or otherwise connected to a network. The timestamp may include precision to the nanosecond level and may be abstracted to one or more less precise time indicators (e.g., minute, hour, day, etc.).

In some embodiments, the dataset(s) including known network identifiers for networks managed by entities may include known network identifier(s) and corresponding entity identifier(s). The known network identifiers may correspond to a network that is owned, managed and/or otherwise the responsibility of an entity. The known network identifiers may be an IP address, including, for example, an IPv4 address or an IPv6 address as described herein. The entity identifiers may correspond to an entity including, for example, corporations, schools, governments, individuals, etc. The entity identifier may include a name of an entity or any other identifier that may uniquely identify the entity (e.g., a global unique identifier (GUID)). In some cases, the dataset(s) including known network identifiers for networks managed by entities may include an indication of whether an entity is a service provider or a non-service provider. A service provider may be an entity that provides Internet-connectivity services to their users, clients, and/or customers.

In some embodiments, all or a subset of the identifiers as described herein may be obfuscated. For example, device identifiers may be obfuscated to protect the privacy of the users of the devices associated with the device identifiers. The identifier(s) may be obfuscated using one or more hashing techniques including, for example, message-digest 5 (MD5) or Secure Hash Algorithm (SHA-1, SHA-2, SHA-3, etc.). Obfuscated identifiers may retain their unique properties to differentiate from other identifiers as described herein.

FIG. 1 illustrates an exemplary computing environment 100 that comprises an exemplary computer network 101 for an entity, an exemplary computer network 111 for a first WFH-RO network, and an exemplary computer network 121 for a second WFH-RO network. The exemplary network 101 can include a modem 102 (e.g., a cable modem, a digital subscriber line (DSL) modem, etc.) configured to connect the network to the Internet and a router 104 configured to create the network. The network 101 can include one or more of the network identifiers (e.g., IP addresses) as described herein. The router 104 can connect directly to exemplary entity associated devices 108a-108c (collectively referred to as 108). The router may not connect directly to non-entity associated devices 110a-110c (collectively referred to as 110). The entity associated devices 108 and/or the non-entity associated devices 110 can include one or more of the device identifiers as described herein. The entity associated devices 108 may be associated with the entity that manages the computer network 101. For example, the entity associated devices 108 may each belong to an individual who is an employee of the entity (e.g., a corporation). The non-entity associated devices 110 may not be associated with the entity that manages computer network 101. In some embodiments, the router 104 is connected to one or more wireless access points (WAP(s)) that are each configured to create a wireless local area network (WLAN) for connecting to entity associated devices 108. WAP(s) can create private networks (e.g., 106, 116b, or 126) and/or public networks (e.g., 116a). In some embodiments, WAP(s) can be connected to a switch or hub to create the WLAN(s). WAP(s) can create private networks.

The exemplary Work from Home Remote Office (WFH-RO) network 111 can include a modem 112 (e.g., a cable modem, a digital subscriber line (DSL) modem, etc.) configured to connect the network to the Internet and a router 114 configured to create the network. The WFH-RO network 111 can include one or more of the network identifiers (e.g., IP addresses) as described herein. The router 114 can connect directly to exemplary entity associated devices 108a-108c (collectively referred to as 108) and/or non-entity associated devices 110a-110c (collectively referred to as 110). In some embodiments, the router 114 is connected to one or more wireless access points (WAP(s)) that are each configured to create a wireless local area network (WLAN) for connecting to entity associated devices 108 and/or non-entity associated devices 110.

The exemplary Work from Home Remote Office (WFH-RO) network 121 can include a modem 122 (e.g., a cable modem, a digital subscriber line (DSL) modem, etc.) configured to connect the network to the Internet and a router 124 configured to create the network. The WFH-RO network 121 can include one or more of the network identifiers (e.g., IP addresses) as described herein. The router 124 can connect directly to exemplary entity associated devices 108a-108c (collectively referred to as 108) and/or non-entity associated devices 110a-110c (collectively referred to as 110). In some embodiments, the router 124 is connected to one or more wireless access points (WAP(s)) that are each configured to create a wireless local area network (WLAN) for connecting to entity associated devices 108 and/or non-entity associated devices 110.

Network Characterization Via Device Activity

FIGS. 2A, 2B, 2C, and 2D are a flowchart of an exemplary method 200 for assessing cybersecurity state of entities based on identification of Work from Home Remote Office (WFH-RO) networks associated with an entity. In step 202, a network dataset is obtained for one or more computer networks associated with an entity and for one or more WFH-RO networks. An exemplary network dataset can include one or more network identifiers, device identifiers, and/or timestamp identifiers as described herein that indicate a time and/or duration (associated with a timestamp identifier) at which a computing device (associated with a device identifier) accessed a computer network (associated with a network identifier). An entry in the network dataset can include one or more fields for: a network identifier, a device identifier, and a timestamp identifier. For example, the entry can include an IP address of a wireless network (e.g., computer network 101) accessed by a laptop computing device, an IMEI number of the laptop computing device, and a timestamp indicating the time at which the laptop computing device accessed the wireless network. The size of the network dataset may be based on a duration and/or a number of the instances for which network activity was sampled. In some cases, the network dataset can include one or more header fields (e.g., X-Forwarded-For header fields), where each header field can include an originating IP address (e.g., the IP address of a client of a proxy or a load balancer) for network access. For example, an entry in the network dataset may include fields for a network identifier, a device identifier, a timestamp identifier, and an X-Forwarded-For header (if applicable).

In step 204, IP address(es) for the entity can be obtained. The IP address(es) for the entity may be obtained as one or more datasets and/or as one or more asset maps, where an asset map includes information mapping one or more IP addresses to an entity. In some cases, the entity can be a proxy service or a load balancer service, where the IP address(es) are for a proxy service or a load balancer service (e.g., a proxy dataset). In some embodiments, the network dataset(s) (including the network identifiers, device identifiers, and/or timestamp identifiers) and the IP address(es) for the entity can be obtained separately and/or obtained from separate sources. The IP address(es) for the entity can be associated with the name of the entity or an identifier (e.g., a global unique identifier (GUID)) of the entity. The IP address(es) for the entity and/or the GUID of an entity may be classified as associated with a service provider or a non-service provider, where a service provider may be an entity that provides internet-connectivity services to their users, clients, and/or customers as described herein. In some embodiments, the network dataset(s) may be drawn from a third-party data provider via, e.g., an application programming interface (API) or software development kit (SDK). Examples of how IP addresses for entities may be obtained are discussed below under heading "IP Addresses and Associated Security Characteristics."

In some embodiments, multiple network datasets can be obtained for the same network. Each network dataset may be associated with a unique time and/or duration (e.g., as indicated by the timestamp identifier(s) in the entry(ies) of the network dataset). For example, each network dataset may include a timestamp identifier indicating the time of day, day, month, etc. that the data was collected.

In some embodiments, the system can determine whether entries in the network dataset are attributed to a proxy service or load balancer service based on the IP address of the entry. In some cases, the system can determine the originating IP address for an entry of the network dataset based on header information (e.g., X-Forwarded-For header information) included in an entry.

In step 206, the system can join (e.g., outer join) entries in the network dataset to entries in a proxy dataset to identify entries in the network dataset corresponding to a proxy service or load balancer service. A proxy dataset (e.g., as obtained in step 204) may include one or more entries including the IP address(es) and the name(s) of proxy service(s) and/or load balancer service(s) known to the system. By joining the network dataset to the proxy dataset, the system can identify entries in the network dataset that include network identifiers (e.g., IP addresses) associated with a proxy service and/or a load balancer service. The IP address(es) of a proxy service or a load balancer service in entries of the network dataset may misrepresent the IP address accessed by a computing device, which can be (properly) identified in header information in corresponding entries as described herein.

In step 208, for entries in the network dataset that were joined to entries in the proxy dataset (e.g., as in step 206), the system can replace the proxy and/or load balancer IP address(es) (e.g., the network identifiers in the network dataset) with the origin IP address comprised in the header information (e.g., X-Forwarded-For header) corresponding to each entry. For example, the system can replace an IP address in an entry of the network dataset with the IP address (e.g., the right-most IP address) included in the X-Forwarded-For header to confirm that the observed network activity in the network dataset is appropriately attributed to the originating IP address (e.g., a user's home computing network). Based on replacing the proxy and/or load balancer IP address(es) with the origin IP address for each joined entry in the network dataset, each X-Forwarded-For header may be dropped and/or otherwise removed from the network dataset. In some cases, step 208 may be repeated recursively such that all X-Forwarded-For headers are removed from entries in the network dataset.

In step 210, the system can join (e.g., outer join) entries in the network dataset to the IP address(es) for the entity. Based on joining entries in the network dataset to the IP address(es) for the entity, entries in the network data set may include a network identifier, a device identifier, a timestamp identifier, and a name or GUID of the entity associated with the network identifier. For entries with network identifiers that don't correspond to the IP address(es) for the entity, the entries may include a network identifier, a device identifier, and a timestamp identifier. The inclusion of the name or GUID of the entity with the network identifier, device identifier, and timestamp identifier in an entry can indicate that device or user associated with the device identifier accessed a network associated with the entity. For example, an entry in the network dataset can indicate that a user connected their computing device to the entity's wireless network, connected their computing device via Ethernet provided by the entity, accessed the entity's network via a Virtual Private Network (VPN) service, or subscribed to the entity.

In step 212, the system can group the network dataset based on each device identifier to determine the distinct number of network identifiers associated with each device identifier. For example, the system can group the network dataset to determine that 4 distinct IP addresses are associated with a particular device serial number. In step 214, the system can remove entries from the network dataset for device identifiers associated with less than a threshold number of network identifiers. In some cases, the threshold number of network identifiers can be 2. For example, the system can remove an entry in the network dataset for a device identifier associated with only 1 IP address. Step 212 and step 214 may be optional steps to reduce the network dataset such that device identifiers observed on less than a threshold number of IP addresses are removed from the network dataset. The result of step 214 may be a reduced network dataset.

In step 216, the system can group the network dataset (from step 210) or the reduced network dataset (from step 214) based on a device identifier and a GUID of the entity associated with the device identifier (hereinafter "associated GUID") to generate device identifier and associated GUID (hereinafter "device identifier-associated GUID") pairs. As an example, a device identifier-associated GUID pair may be represented as [IMEI number, associated GUID]. The device identifier-associated GUID pairs may identify the associated GUID(s) for each device identifier and the associated device identifier(s) for each GUID. For example, the network dataset may be grouped such that the system determines a particular GUID is associated with 10 device identifiers, resulting in 10 distinct device identifier-associated GUID pairs. By grouping device identifiers with associated GUIDs, the system can determine the associated GUIDs (and entities) for device identifiers, effectively determining the distinct entity computing networks accessed by computing devices and/or the distinct device identifiers observed on entity computing networks.

In step 218, the system can remove and/or otherwise drop entries of device identifier-associated GUID pairs for associated GUIDs of service provider entities. The resulting dataset from step 218 can comprise device identifier-associated GUID pairs for non-service provider entities. The device identifier-associated GUID pairs can indicate the dataset for potential computing device(s) associated with each entity and the entities for which to determine associated WFH-RO network(s). For example, the device identifier-associated GUID pairs resulting from step 218 may indicate the computing device(s) that, if observed on a network of the entity, may impact an entity's cybersecurity state (e.g., security rating, level of security, etc.). In some cases, in step 218, the system can optionally group the resulting dataset by device identifier and to determine the number of non-service provider entities that each device identifier has been observed on. Based on determining a particular device identifier has been observed on more than a threshold number of non-service provider network identifiers (e.g., IP addresses), the system may drop and/or otherwise remove entries including the device identifier from the dataset. In some cases, the threshold number of non-service provider network identifiers may be 2. This would ensure that device identifiers being processed are those that were ever observed on only at maximum one non-service providers and an unlimited number of service providers.

In step 220, the system can join (e.g., inner join) the device identifier(s) of the device identifier-associated GUID pair(s) (from step 218) with the network dataset (from step 210) or the reduced network dataset (from step 214) to determine the network identifier(s) (e.g., IP address(es)) accessed by devices that also accessed a network of the associated GUID (and entity). The device identifier(s) of the device identifier-associated GUID pair(s) can be inner joined with the network dataset based on the device identifier to determine the IP address(es) associated with each device identifier-associated GUID pair. By joining the device identifier-associated GUID pairs with the network dataset, the system can determine the network(s) (other than the network(s) managed by the entity of the GUID) that were accessed by the computing device associated with the device identifier.

In step 222, the system may group the dataset (from step 220) in [associated GUID, IP address] pairs to aggregate timestamp identifiers and determine the number of distinct device identifiers from the [associated GUID, IP address] pairs that were observed on each network identifier (e.g., IP address) of the [associated GUID, IP address] pairs. The resulting data from step 222 would include the distinct number of entity-originated computing devices (e.g., computing devices from a device identifier-GUID pair) that accessed each network identifier (e.g., IP address) for a particular GUID. For example, querying for an associated GUID within the resulting dataset from step 222 can yield the network identifier(s) on which devices associated with the GUID network(s) have been observed, as well as the distinct number of device identifiers (from a particular GUID) observed on each of the network identifier(s). The resulting data from step 222 may include the number of device identifiers associated with an entity observed on a particular network identifier (e.g., 6 device identifiers associated with an entity GUID were observed on a particular IP address).

In step 224, using the network dataset (from step 210) or the reduced network dataset (from step 214), the system can group the network identifier(s) (e.g., IP address(es)) and GUID(s) to determine the number of distinct device identifiers observed on each network identifier (e.g., IP address) included in the network dataset. The GUIDs grouped by the system in step 224 may represent originated GUID(s), where an originated GUID is for the entity that manages, owns, and/or is otherwise responsible for the IP address. The number of distinct device identifiers observed on each network identifier may represent a broader dataset than that determined in step 222, as step 222 can be directed to determining device identifiers observed on a particular IP address, where the device identifiers are each associated with the same entity (e.g., the same associated GUID), whereas the device identifiers observed on an IP address as determined in step 224 may be associated with any (and/or no) GUID.

Figure 2A:
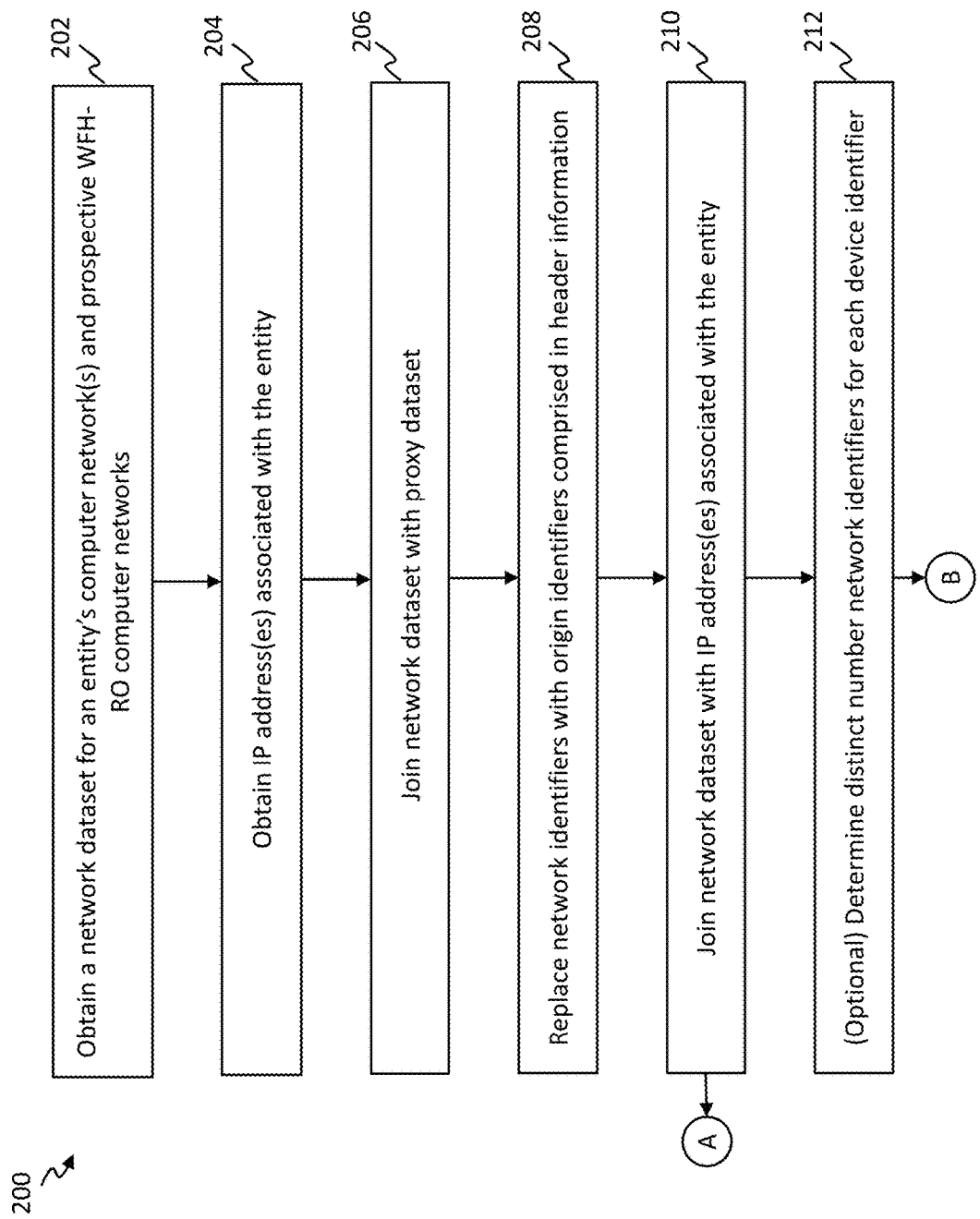
FIG. 2A is a flowchart of an exemplary method for assessing cybersecurity state of entities based on identification of Work from Home Remote Office (WFH-RO) networks associated with the entities.
Figure 2B:
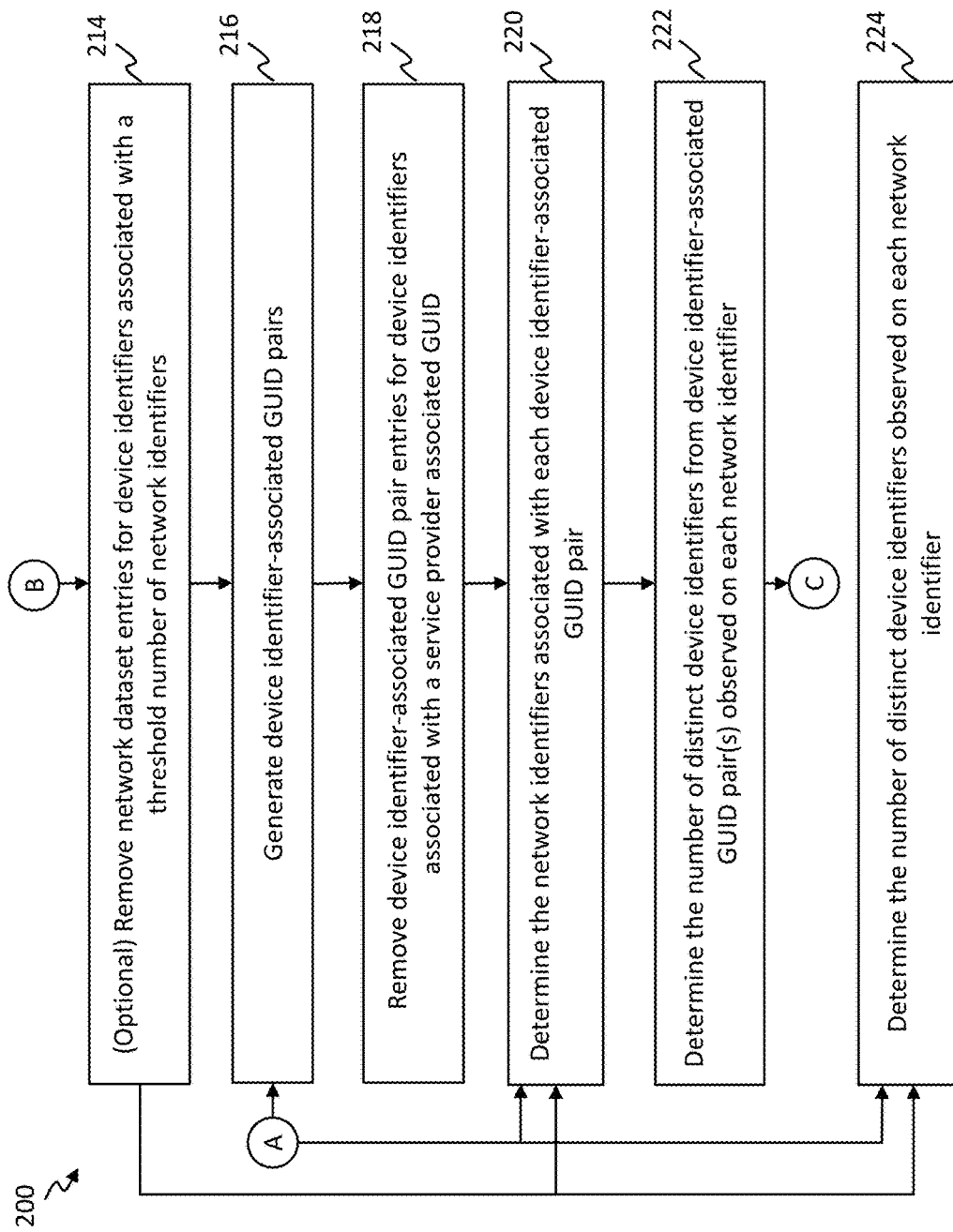
FIG. 2B is a flowchart of an exemplary method for assessing cybersecurity state of entities based on identification of WFH-RO networks associated with the entities.
Figure 2C:
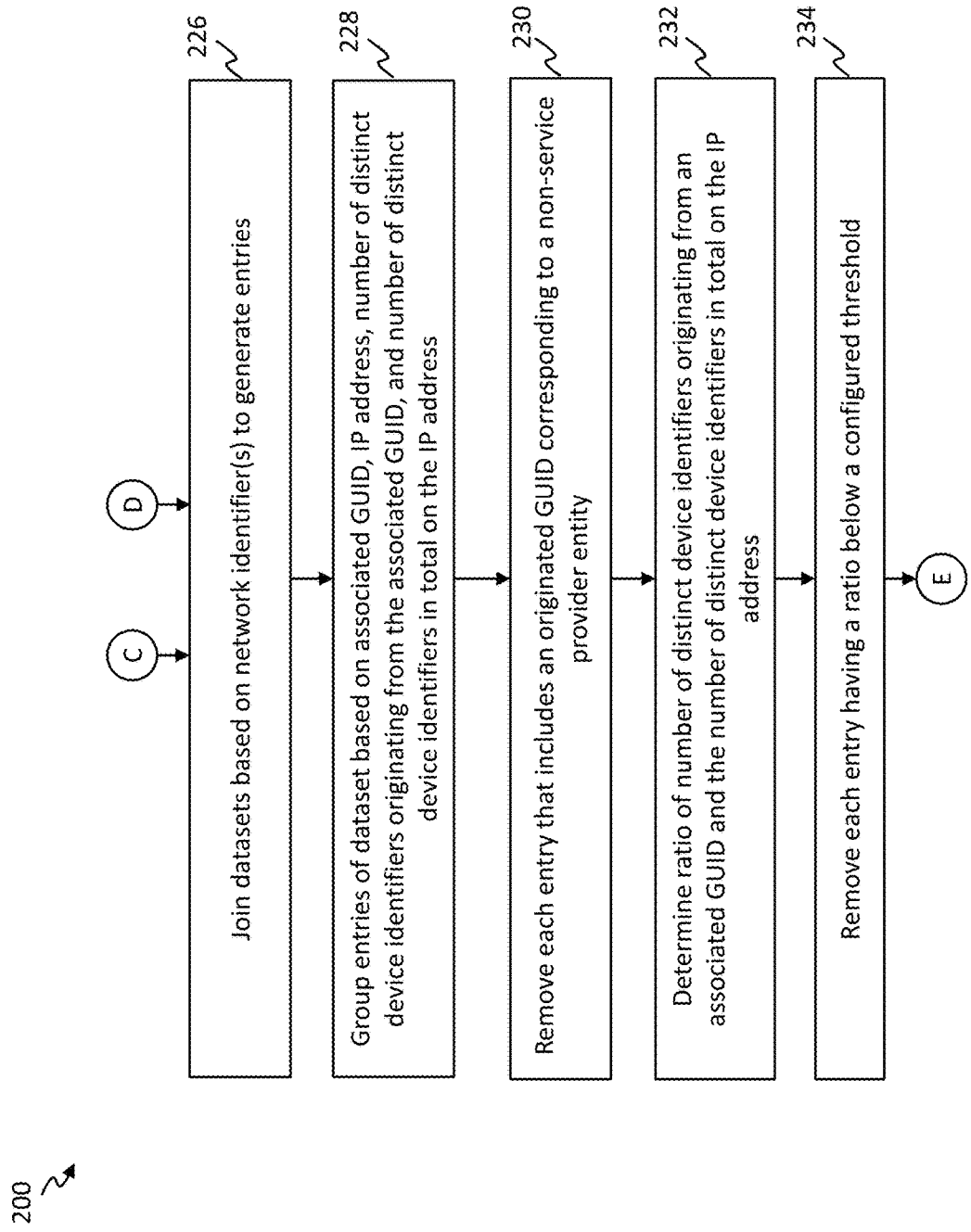
FIG. 2C is a flowchart of an exemplary method for assessing cybersecurity state of entities based on identification of WFH-RO networks associated with the entities

In some embodiments, as shown in FIG. 2C for step 226, the system can join (e.g., inner join) the resulting datasets of step 222 and step 224 to generate a dataset with one or more entries including, but not limited to: the associated GUID (e.g., of a device identifier-associated GUID pair), IP address (e.g., the IP address on which a computing device was observed), number of distinct device identifiers originating from the associated GUID observed on the IP address (as determined in step 222), number of distinct device identifiers in total on the IP address (as determined in step 224), and the originated GUID (e.g., the GUID of the entity that manages the IP address). In some cases, the entries may include timestamp identifier(s) corresponding to the time/duration at which the computing device was observed on the IP address.

In step 228, using the dataset of step 226, the system can group the dataset by the associated GUID, IP address, number of distinct device identifiers originating from the associated GUID observed on the IP address, and number of distinct device identifiers in total observed on the IP address. In some cases, additionally, the system can aggregate the originated GUIDs and observed timestamps.

In step 230, the system can remove each entry from the dataset (of step 228) that includes an originated GUID corresponding to a non-service provider entity in the list of aggregated originated GUIDs of each entry. By removing entries that include non-service provider originated GUIDs, the system generates a resulting dataset that includes (device identifier-associated GUID, IP address) entries that are not associated with a non-service provider (e.g., corporate entity) network identifier. The resulting dataset can therefore include (device identifier-associated GUID, IP address) entries that are only associated with a service provider (e.g., corporate entity) network identifier.

In step 232, the system can determine a ratio of the number of distinct device identifiers originating from an associated GUID (e.g., devices identified in device identifier-associated GUID pairs for a particular associated GUID) to the number of distinct device identifiers in total on the IP address for each entry of the dataset (from step 228). For example, the system may determine the number of distinct device identifiers originating from a GUID (associated with an entity's computing network including one or more IP addresses) that were observed on a particular IP address to be 2 device identifiers. The system may determine the number of distinct device identifiers originating from (e.g., observed on) the IP address to be 16 device identifiers, yielding a ratio of 0.125.

In step 234, the system may remove each entry of the dataset having a determined ratio (e.g., as computed in step 232) that is below a configured threshold. For example, if the configured threshold is 0.25, the determined ratio of 0.125 for the example as described herein would not achieve the configured threshold of 0.25, resulting in the entry that yielded the determined ratio of 0.125 to be removed from the dataset. The configured ratio may be any value, including 0.1, 0.2, 0.3, 0.5, etc.

Figure 2D:
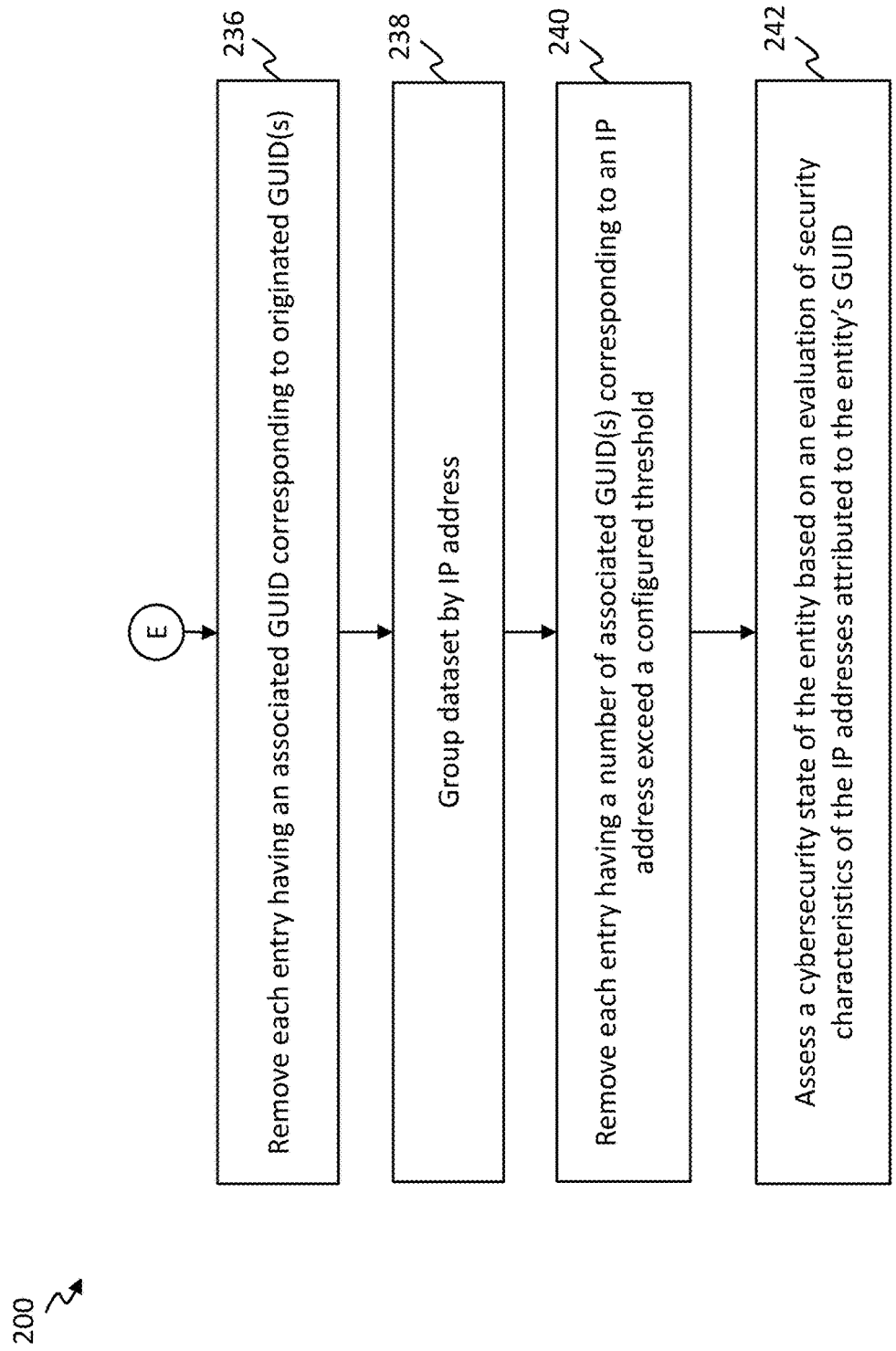
FIG. 2D is a flowchart of an exemplary method for assessing cybersecurity state of entities based on identification of WFH-RO networks associated with the entities.

In some embodiments, as shown in FIG. 2D for step 236, the system can remove each entry of the dataset having an associated GUID corresponding to one or more originated GUID(s) stored in the dataset. An entry requiring removal would include at least one associated GUID (e.g., indicating the entity network(s) accessed by a computing device) corresponding to the originated GUID for the IP address (e.g., where the entity manages the IP address) included in the entry. To initiate removal, the system can compare each entry of the dataset having an associated GUID corresponding to (e.g., matching) the originated GUID also stored in the entry (if present). As an example, an instance of an associated GUID corresponding to the originated GUID can occur if a computing device egressed through more than one IP address managed by an entity, such as if the computing device was used in more than one office location of the time window(s) stored in the dataset.

In step 238, the system can group the dataset by IP address (e.g., the IP on which a computing device was observed). By grouping the dataset by IP address, the system can aggregate the associated GUID(s) that correspond to each IP address and determine the earliest and latest timestamps observed for each IP address. In some cases, the system can determine the number of associated GUID(s) that correspond to each IP address, which can represent the number of entities having connected computing devices that access the IP address.

In step 240, the system can remove each entry of the dataset having a number of associated GUID(s) that correspond to each IP address (e.g., as determined in step 238) exceed a configured threshold. The configured threshold may be any suitable number including 2, 3, 5, 10, 15, etc. For example, the system may determine 18 associated GUIDs to be associated with an IP address via one or more device identifiers, with a configured threshold of 20 GUIDs. Accordingly, the entries that include the IP address may remain in the dataset. As another example, the system may determine 27 associated GUIDs to be associated with an IP address, with a configured threshold of 20 associated GUIDs. Accordingly, the entries that include the IP address may be removed from the dataset. By removing entries for IP addresses associated with a greater than (or equal to) a threshold number of associated GUID(s), the system can safeguard against device identifiers that are not unique. For example, entries for computing devices with erroneous device identifiers (e.g., an IMEI number of "00000000000000") may be removed from the dataset, as multiple computing devices having an IMEI number of "00000000000000" can result in a large number of entities observing the IMEI number of "00000000000000" on their managed IP address(es). The resulting dataset(s) of step 240 may have one or more entries including, but not limited to: associated GUID, IP address (e.g., the IP address on which a computing device was observed), and the originated GUID (e.g., for the entity that manages the IP address if the entity is known to the system). The IP address(es) resulting from step 240 may represent the WFH-RO network(s) that can be attributed to an entity (e.g., corresponding to the associated GUID), as well as impact the cybersecurity state (e.g., security rating, level of security, etc.) of the entity. In some cases, the entries may include timestamp identifier(s) corresponding to the time/duration at which the computing device was observed on an IP address. Based on the associated GUID and the corresponding IP address(es), the system may determine the cybersecurity state (e.g., security rating, level of security, etc.) of an entity corresponding to the associated GUID.

In some embodiments, once each IP address is attributed to associated GUID(s), one or more security characteristics of each IP address may be determined. Examples of security characteristics of computer network(s) and associated IP address(es) are described further below under heading "IP Addresses and Associated Security Characteristics."

In step 242, the cybersecurity state (e.g., security rating, level of security, etc.) of the entity can be assessed based on an evaluation of the security characteristics of the IP address(es) (e.g., the WFH-RO networks) attributed to the entity's GUID. Examples of determining the security ratings of entities are described further below under heading "Security Ratings of Entities."

IP Addresses and Associated Characteristics

In some embodiments, having identified WFH-RO networks attributed to an entity, the system can determine the security characteristics associated with each network and the entity. For example, the security characteristics associated with the network can be gleaned from the Internet Protocol (IP) address(es) attributed to that network. Examples of determining and/or evaluating the security characteristics of entities and associated IP addresses can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," and U.S. Pat. No. 9,830,569 issued on Nov. 28, 2017 and titled "Security Assessment Using Service Provider Digital Asset Information," all of which are incorporated herein by reference in their entireties. Examples of mapping IP addresses to entities can be found in U.S. Publication No. 2018/0375822 published on Dec. 27, 2018 and titled "Methods for Mapping IP Addresses and Domains to Organizations Using User Activity Data," which is incorporated herein by reference in its entirety.

In general, Regional Internet Registries (RIRs) manage the allocation and registration of Internet number resources (IP Addresses, Autonomous System Numbers, etc.) within a particular region of the world. There are five RIRs—ARIN for North America, AfriNIC for Africa, APNIC for Asia Pacific, RIPE for Europe, Middle East, Central Asia, and LACNIC for Latin America.

The RIRs allocate the address space to service providers, corporations, universities, etc. The RIRs provide various interfaces that enable queries of the RIR to determine who owns a given IP address. It is also possible to query the database by an entity name and get a list of IP addresses allocated to that entity. Despite lack of standardization of entity names in the RIR databases, well-chosen queries can result in a very high coverage of addresses owned by an entity.

Another problem is that RIRs often allocate large chunks of addresses to Internet Service Providers (ISPs) who go on to allocate smaller address spaces to their customers. ISPs are under no obligation to report this data back to anyone. Most small companies contract with their local ISP for Internet access and don't obtain addresses from RIRs.

These problems are addressed by the entity ownership collection system (described below) being configured to execute various heuristic processes including the following non-limiting list of examples:

1. Using the 'dig' (http://linux.die.net/man/l/dig) tool to determine any IP information published by an entity. The dig tool takes the domain name of the entity as an argument. For example, execution of 'dig a.com ANY' returns all IP information published by the entity a.com.
2. Use the IP addresses and domain names published to find ranges of IP addresses actually used. ISPs almost always allocate addresses in size of powers of 2 (2, 4, 8, etc.). Knowing one IP address allows probing around that space. The 'whois' (http://linux.die.net/man/l/whois) tool can be used to determine ownership of neighborhood addresses.
3. Even if the entity does not publish any IP information that can be retrieved through dig, most entities have servers whose names may be guessed. Mail servers for the domain a.com often have the name mail.a.com, SMTP servers tend to be smtp.a.com, FTP servers tend to be ftp.a.com etc. Using a tool like nslookup, the entity ownership collection system can verify if any of these common names are in use by the entity.
4. If an IP address is found, the system is configured to probe around the address (such as in step 2) to determine any addresses in the neighborhood owned by that entity.
5. Searching around the website of the company often gives a hint of other servers hosted by the company (ex: reports.a.com) which can be used as a starting point for search.

The entity ownership collection system gathers information about an entity. This includes information about which IT assets an entity owns, controls, uses, or is affiliated with. Examples of asset ownership include control and operation of an Internet Protocol (IP) network address range or computer services such as web servers residing within that address block. Information about entities also includes relationships such as subsidiaries, affiliates, etc., that describe entity association.

Security Ratings of Entities

In some embodiments, the security characteristics of an entity's network(s) (including the applicable WFH-RO network(s)) can be evaluated to assess the entity's cybersecurity states, and/or how the addition or selective removal of various WFH-RO networks may impact a security rating. Specifically, the security characteristics can be evaluated to determine the entity's security rating with the WFH-RO networks and without the WFH-RO networks identify potential areas of risk associated with certain networks. The entity's security rating can be provided to the entity as a measure of that entity's risk of security breaches and/or past security record.

In various embodiments, networks can be characterized for each individual entity. In some embodiments, in parent-child entity relationships (e.g., parent company and subsidiary company), an IP address is attributed to a parent entity's subsidiary and the parent entity. For security ratings purposes, an IP address and/or computer network would be associated with both the entity and any other entities that are parents of that entity.

Examples of determining and/or evaluating the security characteristics of entities and associated IP addresses, and determining security ratings of entities based on the security characteristics can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," U.S. Pat. No. 9,830,569 issued on Nov. 28, 2017 and titled "Security Assessment Using Service Provider Digital Asset Information," and U.S. patent application Ser. No. 16/514,771 filed on Jul. 17, 2019 and titled "Systems and methods for generating security improvement plans for entities", all of which are incorporated herein by reference in their entireties.

In some embodiments, determining security risk of entities uses externally observable information as proxies for (i) the effectiveness of the overall security performance of the policies and controls that entity implements and exercises and/or (ii) the vulnerability of the entity to security risk. This externally observable information can be categorized into observable subject areas, or "vectors", which can each be independently determined and/or characterized. For example, one possible proxy for entity vulnerability is the number of entity-owned IP addresses which are reported by third parties to be malicious. The greater the number of reports, the more likely the particular entity was vulnerable and had been compromised. Examples of subject areas ("vectors") may include:

an amount of capital investment in the security of the entity;

a measure of employee training in the security of the entity;

a measure of organization of entity personnel dedicated to information security;

an amount of the entity's budget dedicated to information security;

a number and/or severity of botnet infection instances of a computer system associated with the entity;

a number of spam propagation instances originating from a computer network associated with the entity;

a number of malware servers associated with the entity;

a number of potentially exploited devices associated with the entity;

a number of hosts authorized to send emails on behalf of each domain associated with the entity;

a determination of whether a DomainKeys Identified Mail (DKIM) record exists for each domain associated with the entity and/or a key length of a public key associated with a Domain Name System (DNS) record of each domain associated with the entity;

an evaluation of a Secure Sockets Layer (SSL) certificate and/or a Transport Layer Security (TLS) certificate associated with a computer system of the entity;

a number and/or type of service of open ports of a computer network associated with the entity;

an evaluation of security-related fields of an header section of HTTP response messages of hosts associated with the entity;

a rate at which vulnerabilities are patched in a computer network associated with the entity;

an evaluation of file sharing traffic originating from a computer network associated with the entity;

a number of lost records and/or sensitivity of information in the lost records in a data breach of a computer system associated with the entity;

a determination of underwriting, evaluating, and monitoring for cyber insurance of the entity; and/or an evaluation of an adjustment (e.g., automatic adjustment) of access control policy for specific groups and/or individuals of the entity (e.g., a change in VPN access).

In some embodiments, received data for an entity can include two or more subject areas (e.g., of those listed above). In some cases, determining the security rating for an entity can include determining the relationship between the first subject area and the second subject area. This relationship can be stored in a database and accessed for use. For example, the number of botnet infections of an entity may be correlated with the number of potentially exploited devices associated with the entity. This correlation can be stored and referenced in the future. In some embodiments, the security characteristic of an entity is associated with, related to, or equal to the security rating of that entity (e.g., on a scale from 300 to 900, as provided by BitSight Technologies, Inc., Boston, MA).

In some embodiments, to compute the security ratings for an entity, obtained data pertaining to the IT assets owned by that entity may be aggregated. For example, IT assets can include the IP addresses controlled by the entity and obtained data can include the activity associated with those IP addresses. To determine externally observable information about IP address-based assets, one or more IP addresses can be associated with an entity. The data may be processed to determine additional information. For example, processing may yield a list of IP addresses for an entity that has demonstrated suspicious or malicious behavior or fails to follow best security practices for the given reference data point. Similar methods can be used for other types of assets, e.g., domain-based assets, or other information for which an asset can be determined to be associated to an organization. Using these techniques, information about that asset can be associated with the entity.

The exemplary security ratings systems and methods may be configured to account for differences in data sources and types. Given each data source's potentially unique insight of an entity, there can be two or more techniques used to take advantage of the respective data. Data source-specific modeling techniques may be applied to some or all of the data sources to demonstrate feasibility and validate the approach for each data source and modeling technique.

In some embodiments, the combination of two or more vectors may produce a security rating that reflects the effectiveness of an entity's security efforts. The determination of individual vectors and the overall security rating can be influenced by security best-practices as promoted by standardized and accepted cybersecurity frameworks. In some embodiments, evidence of security compromise can be used to understand the specific impact the individual vectors have on the security rating of the entity. For instance, correlation between sources of externally observed information can be used to determine the impact of vectors. For example, the vectors representing evidence of compromised workstations (owned or controlled by an entity) may represent a significant portion of the entity's ability to implement security controls correctly, and thus may influence the entity's security rating more than other types of information.

Security Consideration Analysis for Entities

In some embodiments, with the shift to remote work, entities may need to be able to measure the security characteristics of a collective remote workforce as compared to, in the context of and/or combined with the security characteristics of the on-premise workforce. In some embodiments, as described herein, the security characteristics of an entity's network(s) (including the applicable WFH-RO network(s)) can be evaluated to assess the entity's cybersecurity states. Security ratings may be derived from configurable collections of one or more WFH-RO networks as a part of an entity's network(s). As an example, WFH-RO network(s) can be grouped geographically to create an entity WFH-RO security configuration for a particular geographic region (e.g., a configuration that includes WFH-RO networks in the northeastern United States). In addition or in other cases, the determined WFH-RO network(s) can be grouped based on each WFH-RO network's association with employees of a specific office location and create a corresponding entity security configuration on an office-by-office basis, independent of where the individuals are actually located. For a particular security configuration, differences in the security characteristics of the networks attributed to the entity (or particular office location(s) of the entity) that include the WFH-RO networks can be compared with one or more entity security configurations that exclude the WFH-RO networks. While the WFH-RO networks are typically not owned or controlled by the entity, incorporation of WFH-RO networks to determine security characteristics allows for an enhanced understanding of an entity's comprehensive (e.g., on-premise and off-premise) cybersecurity presence.

In some embodiments, an entity network and/or data access policies are introduced based on the determined WFH-RO network telemetry. For example, a particular WFH-RO network is deemed to be compromised or shows vulnerabilities, policies can be introduced for that particular WFH-RO network to minimize access to sensitive information, increase activity monitoring of individuals on those networks, and/or to increase the amount of logging such that more data is available for eventual analysis or post-event investigations.

In some embodiments, network and/or data access policies may be based on the computing devices that access the WFH-RO networks. For example, an entity may determine a device identifier observed on a WFH-RO network corresponds to a gaming console, which may be deemed a low risk computing device that does not impact network and/or data policies. Based on information aggregated from the WFH-RO network(s), an entity can make policy and/or accessibility decisions based on computing device types, identified vulnerabilities, user access behaviors, and/or any other identified security characteristics associated with the WFH-RO network(s).

In some embodiments, an entity can characterize WFH-RO networks of specific individuals associated with entity. An entity may place a greater importance on WFH-RO networks associated with high-ranking individuals (e.g., executives, those with access to sensitive information, HR staff, etc.) associated with the entity, as the devices and networks of these individuals are often targeted by attackers either directly or through the use of phishing expeditions. In some cases, in place of or in addition to targeting a high ranking individual, attackers may target other individuals that also access the WFH-RO network (e.g., family members) or passive IoT devices (e.g., smart thermostats, home security systems, etc.). By analyzing information associated with the WFH-RO network, entities can identify vulnerabilities as they occur, as well as quantify both the absolute and marginal risks associated with the use of the WFH-RO network by individuals associated with the entity.

In some embodiments, an entity may compare the performance of security characteristics (e.g., security ratings) when a percentage of an employee base accesses entity networks remotely (e.g., is working from home) versus when the employee base accesses entity networks at an entity's facility (e.g., at an office location). The comparison can be at the individual or collective WFH-RO network level for an entity's computing networks or a subset of an entity's computing networks (e.g., for a particular region, office location, etc.). As such, an entity can determine changes in security characteristics as the percentage of their individuals accessing WFH-RO networks changes. In some instances, a threshold value may be determined that identifies a particular percentage of the workforce that, above which, the security characteristics become unfavorable.

In some cases, entities have observed malicious software (e.g., malware and unpatched systems) migrate from an entity's computing networks to associated WFH-RO networks. The migration of malicious software can be due to the lack of protection and/or monitoring for computing devices (e.g., entity computing devices) that are routinely connected and disconnected from entity computing networks (e.g., when employees connect and disconnect from a corporate VPN associated with the entity). Based on monitoring a WFH-RO, an entity can track adherence to its cyber security practices and the effectiveness of cybersecurity measures associated with the entity's network, as when disconnected from the entity's network(s) (e.g., an entity's VPN) threat detection capabilities and/or firewalls are not in place for a computing device. As an example, a corporate firewall of an entity network can block outgoing connections of malware to command and control servers when the computing device is connected to the entity network; however, when the computing device is disconnected from the entity network and connected to a WFH-RO network, the malware may reach the command and control server, where the malware may steal data or install additional malicious capabilities.

Based on access to WFH-RO network information for a plurality of entities, an entity may be able to benchmark their security characteristics against other entities. These benchmarks can be based on any entity data, such as comparisons against other entities in their geography or industry, size, etc. These security characteristics (including WFH-RO networks) can then be reported to boards, regulators, clients, and/or management teams to assess the potential vulnerability and response readiness of the entity. For example, an entity may report a comparison of security characteristics that include WFH-RO networks and exclude WFH-FO networks and a comparison to other entities (e.g., peers or competitors). In some cases, an entity may work to improve their security characteristics through investment or focus in new training or controls to better protect their managed network(s) and associated WFH-RO networks.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 3:
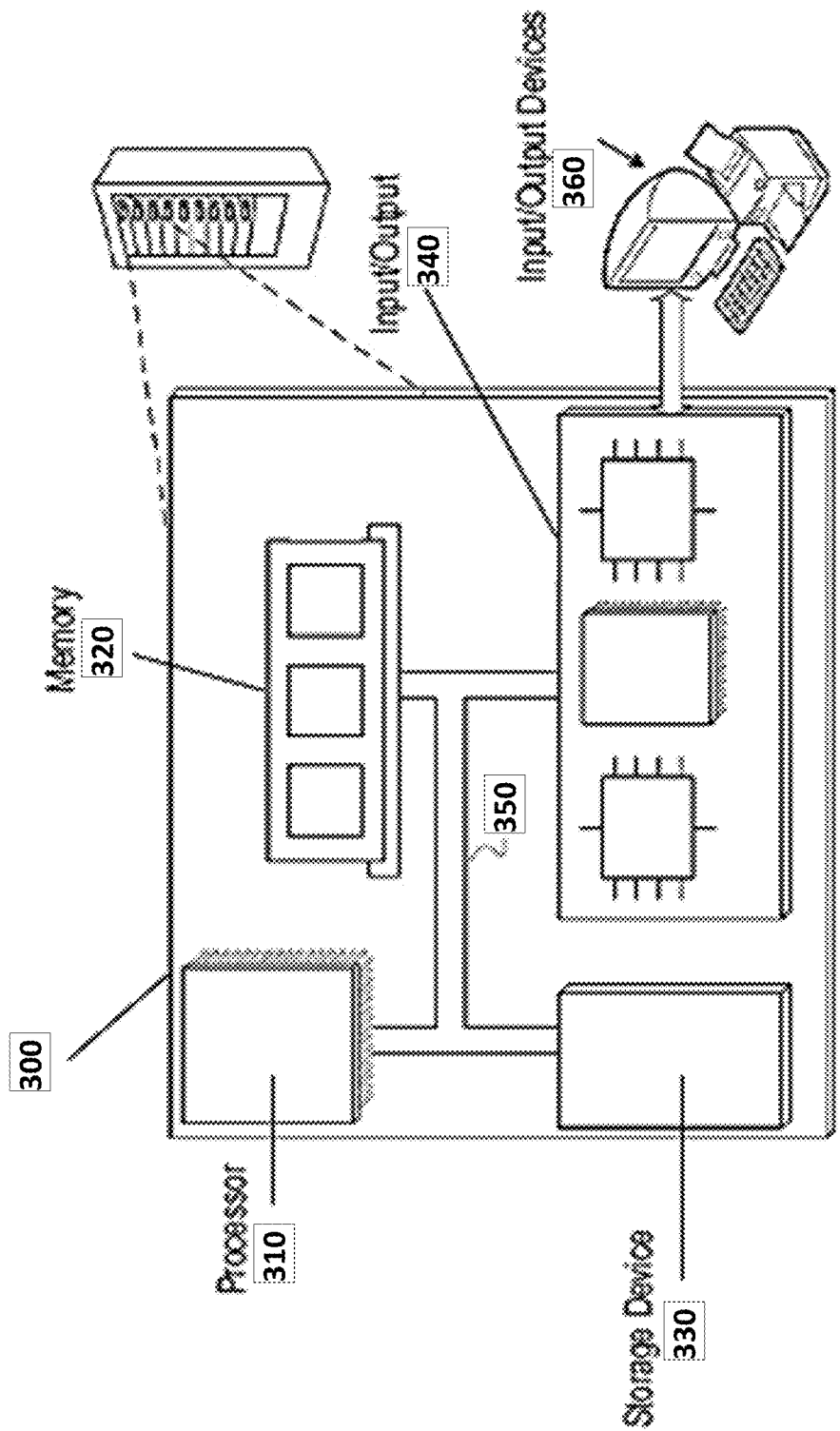
FIG. 3 is a block diagram of an example computer system that may be used in implementing the technology described herein.

FIG. 3 is a block diagram of an example computer system 300 that may be used in implementing the technology described in this document. General-purpose computers, network appliances, mobile devices, or other electronic systems may also include at least portions of the system 300. The system 300 includes a processor 310, a memory 320, a storage device 330, and an input/output device 340. Each of the components 310, 320, 330, and 340 may be interconnected, for example, using a system bus 350. The processor 310 is capable of processing instructions for execution within the system 300. In some implementations, the processor 310 is a single-threaded processor. In some implementations, the processor 310 is a multi-threaded processor. The processor 310 is capable of processing instructions stored in the memory 320 or on the storage device 330.

The memory 320 stores information within the system 300. In some implementations, the memory 320 is a non-transitory computer-readable medium. In some implementations, the memory 320 is a volatile memory unit. In some implementations, the memory 320 is a nonvolatile memory unit.

The storage device 330 is capable of providing mass storage for the system 300. In some implementations, the storage device 330 is a non-transitory computer-readable medium. In various different implementations, the storage device 330 may include, for example, a hard disk device, an optical disk device, a solid-date drive, a flash drive, or some other large capacity storage device. For example, the storage device may store long-term data (e.g., database data, file system data, etc.). The input/output device 340 provides input/output operations for the system 300. In some implementations, the input/output device 340 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 330 may be implemented in a distributed way over a network, such as a server farm or a set of widely distributed servers, or may be implemented in a single computing device.

Although an example processing system has been described in FIG. 3, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
   obtaining, for at least one computer network of a plurality of computer networks associated with an entity, a first network dataset;
   obtaining, for at least one computer network of a plurality of computer networks not associated with the entity and providing access to the at least one computer network of the plurality of computer networks associated with the entity, a second network dataset;
   combining the first and second network datasets to form a combined dataset comprising a plurality of entries, wherein each entry comprises a device identifier, a network identifier, and a timestamp identifier;
   obtaining a plurality of Internet Protocol (IP) addresses associated with the entity;
   obtaining a plurality of IP addresses associated with a plurality of entities unrelated to the entity, wherein the entity and the plurality of entities unrelated to the entity are each associated with a unique identifier (UID);
   for each of the plurality of entries, if the respective network identifier of the entry corresponds to a threshold number of associated UIDs, removing the entry from the combined dataset to form a filtered dataset;

determining, based in part on the IP addresses associated with the entity, whether each of the plurality of computer networks not associated with the entity comprises a remote office network of one or more remote office networks associated with the entity based on the filtered dataset; and assessing a cybersecurity state of the entity based on an evaluation of security characteristics of the IP addresses associated with the entity and security characteristics of one or more IP addresses attributed to the one or more remote office networks.

2. The method of claim 1, wherein each device identifier corresponds to a computing device, wherein each network identifier corresponds to a computer network of the plurality of computer networks associated with the entity or to a computer network of the plurality of computer networks not associated with the entity and providing access to the at least one computer network of the plurality of computer networks associated with the entity, and wherein each timestamp identifier corresponds to a timestamp at which the computing device accessed the computer network.

3. The method of claim 1, wherein the plurality of entities unrelated to the entity comprises a plurality of proxy provider entities, further comprising:
for each of the plurality of entries, if the respective network identifier of the entry corresponds to one of the plurality of proxy provider entities, replacing the network identifier with an origin network identifier.

4. The method of claim 1, further comprising:
for each of the plurality of entries, if the respective device identifier of the entry is associated with less than a threshold number of network identifiers from the plurality of entries, removing the entry from the plurality of entries of the combined dataset.

5. The method of claim 1, further comprising:
mapping the plurality of IP addresses associated with the entity and with the plurality of entities unrelated to the entity to the combined dataset; and based on the mapping, for each of the plurality of entries comprising a network identifier corresponding to one of the mapped plurality of IP addresses, assigning the respective UID associated with the entity or associated with one of the plurality of entities unrelated to the entity to the entry.

6. The method of claim 5, wherein mapping the plurality of IP addresses associated with the entity and with the plurality of entities unrelated to the entity to the combined dataset comprises:
for each of the plurality of entries:
determining whether one of the plurality of IP addresses associated with the entity and with the plurality of entities unrelated to the entity corresponds to the network identifier of the entry; and
if one of the plurality of IP addresses associated with the entity or with the plurality of entities unrelated to the entity corresponds to the network identifier of the entry, identifying the respective UID associated with the corresponding entity or the corresponding one of the plurality of entities unrelated to the entity.

7. The method of claim 5, further comprising:
generating, based on the plurality of entries, a pair dataset comprising a plurality of unique pairs, wherein each unique pair comprises a respective device identifier and a respective UID from one of the plurality of entries.

8. The method of claim 7, wherein the plurality of entities unrelated to the entity comprises a plurality of service provider entities, further comprising:
for each of the plurality of unique pairs, if the unique pair corresponds to one of the plurality of service provider entities, removing the unique pair from the pair dataset.

9. The method of claim 8, wherein removing the respective unique pair from the pair dataset comprises:
determining one of the respective UIDs associated with the plurality of service provider entities corresponds to the respective UID of the unique pair.

10. The method of claim 8, further comprising:
identifying, based on respective device identifiers of both the combined dataset and the pair dataset, each respective UID of the plurality of pairs associated with the respective network identifiers from the plurality of entries; and
assigning the respective identified UIDs of the plurality of pairs to the plurality of entries of the combined dataset as the associated UIDs.

11. The method of claim 10, wherein assigning the respective UIDs of the plurality of pairs to the plurality of entries as the associated UIDs comprises:
for each of the plurality of pairs:
determining whether the respective UID of the respective pair is associated with one or more of the respective network identifiers of the plurality of entries based on the respective device identifier of the respective pair and the respective device identifiers of the plurality of entries; and
if the respective UID of the respective pair is associated with one or more of the respective network identifiers of the plurality of entries, mapping the respective UID of the respective pair to the plurality of entries including the one or more of the respective network identifiers as one of the associated UIDs.

12. The method of claim 10, further comprising:
for each network identifier of the plurality of entries, determining, based on the associated UIDs of the combined dataset, a first number of the respective device identifiers from the plurality of pairs that are associated with the respective network identifier, wherein the first number of the respective device identifiers from the plurality of pairs are each associated with a common associated UID.

13. The method of claim 12, further comprising:
for each network identifier of the plurality of entries, determining a second number of respective device identifiers from the plurality of entries that are associated with the respective network identifier.

14. The method of claim 13, wherein the plurality of entities unrelated to the entity comprises a plurality of non-service provider entities, further comprising:
for each of the plurality of entries, if the respective UID of the entry corresponds to one of the plurality of non-service provider entities, removing the entry from the plurality of entries of the combined dataset.

15. The method of claim 13, further comprising:
for each network identifier of the plurality of entries:
determining a ratio of the first number to the second number; and
if the determined ratio is below a threshold value, removing the respective entry including the respective network identifier from the plurality of entries of the combined dataset.

16. The method of claim 13, further comprising:
for each of the plurality of entries, if the respective UID of the entry matches the respective associated UID of the entry, removing the entry from the plurality of entries of the combined dataset.

17. The method of claim 16, further comprising:
for each of the plurality of entries, determining a number of respective associated UIDs associated with the respective network identifier of the entry.

18. The method of claim 1, wherein determining whether each of the plurality of computer networks not associated with the entity comprises a remote office network of the one or more remote office networks associated with the entity based on the filtered dataset comprises:
for each of the plurality of entries of the filtered dataset, if the UID associated with the entity corresponds to the respective associated UID of the respective entry, associating an IP address to the entity, wherein the IP address corresponds to the respective network identifier of the entry.

19. A system comprising:
one or more computer systems programmed to perform operations comprising:
obtaining, for at least one computer network of a plurality of computer networks associated with an entity, a first network dataset;
obtaining, for at least one computer network of a plurality of computer networks not associated with the entity and providing access to the at least one computer network of the plurality of computer networks associated with the entity, a second network dataset;
combining the first and second network datasets to form a combined dataset comprising a plurality of entries, wherein each entry comprises a device identifier, a network identifier, and a timestamp identifier;
obtaining a plurality of Internet Protocol (IP) addresses associated with the entity;
obtaining a plurality of IP addresses associated with a plurality of entities unrelated to the entity, wherein the entity and the plurality of entities unrelated to the entity are each associated with a unique identifier (UID);
for each of the plurality of entries, if the respective network identifier of the entry corresponds to a threshold number of associated UIDs, removing the entry from the combined dataset to form a filtered dataset;
determining, based in part on the IP addresses associated with the entity, whether each of the plurality of computer networks not associated with the entity comprises a remote office network of one or more remote office networks associated with the entity based on the filtered dataset; and
assessing a cybersecurity state of the entity based on an evaluation of security characteristics of the IP addresses associated with the entity and security characteristics of one or more IP addresses attributed to the one or more remote office networks.

20. The system of claim 19, wherein each device identifier corresponds to a computing device, wherein each network identifier corresponds to a computer network of the plurality of computer networks associated with the entity or to a computer network of the plurality of computer networks not associated with the entity and providing access to the at least one computer network of the plurality of computer networks associated with the entity, and wherein each timestamp identifier corresponds to a timestamp at which the computing device accessed the computer network.

* * * * *